United States Patent [19]

Kobayashi

[11] 4,450,501

[45] May 22, 1984

[54] LIQUID QUANTITY SENSOR OF CAPACITOR TYPE

[75] Inventor: Hiroshi Kobayashi, Yokohama, Japan

[73] Assignee: Nissan Motor Co., Ltd., Kanagawa, Japan

[21] Appl. No.: 497,494

[22] Filed: May 24, 1983

[30] Foreign Application Priority Data

Jul. 6, 1982 [JP] Japan .................. 57-116240

[51] Int. Cl.³ .................. H01G 5/28; G01F 23/00
[52] U.S. Cl. .................. 361/284; 73/304 C
[58] Field of Search .................. 361/284; 73/304 C

[56] References Cited

FOREIGN PATENT DOCUMENTS 1359799 7/1974 United Kingdom .............. 73/304 C
2089516 6/1982 United Kingdom .

Primary Examiner—Donald A. Griffin
Attorney, Agent, or Firm—Lowe, King, Price & Becker

[57] ABSTRACT

A liquid quantity sensor of the capacitor type having at least one pair of electrode plates which are disposed in a liquid container, e.g. an automobile fuel tank, in a spaced and parallel arrangement so as to form a capacitor. Concerning the capacitor electrode plates of an angled shape and to resolve the difficulty in realizing a uniformly constant distance between the two electrode plates in the bent region, one of the two electrode plates is made up of two major flat portions and a minor junction portion which keeps the two flat portions spaced from each other and at an angle in conformance with the bending angle of the other electrode plate, and the two electrode plates are assembled such that the gap between the two flat portions of the split electrode plate is located right opposite the bent region of the other electrode plate.

6 Claims, 7 Drawing Figures

LIQUID QUANTITY SENSOR OF CAPACITOR TYPE

BACKGROUND OF THE INVENTION

This invention relates to a liquid quantity sensor of the type electrically detecting the quantity of liquid existing in a container by utilizing a variation in the capacitance between two metal plates vertically disposed in the container. For example, the liquid container is a fuel tank in a vehicle.

As is known, it is possible to detect the quantity of a liquid existing in a container by fixedly and vertically disposing two adequately spaced flat and parallel, or cylindrical and concentrical, electrode plates in the container and measuring the capacitance between these two electrode plates. This method is based on the fact that most liquid materials have dielectric constants considerably different from the dielectric constant of air. As the liquid level in the container rises or lowers, the submerged fraction of the effective surface area of the capacitor formed by the two electrode plates increases or decreases with a corresponding change in the value of capacitance between the two electrode plates. By suitably designing the configuration of the electrode plates it is possible to establish a practically linear relationship between the level or quantity of liquid existing in the container and the capacitance between the two electrode plates.

When a liquid container provided with a liquid quantity sensor of the described type is kept stationary there is little problem in detecting the liquid quantity. However, the situation is different when the liquid container is installed on a vehicle such as an automobile as a fuel tank. In this case difficulties arise in accurately detecting the quantity of fuel in the tank during running of the vehicle because the fuel tank inclines to various degrees and the fuel itself makes inclining and undulating movements. The difficulties are augmented by rapid and considerable changes in the fuel level attributed to the fact that usually the fuel tank is shallow relative to its lateral widths and has an asymmetric shape in plan view. With a view to resolving such difficulties it is usual to use a liquid quantity sensor having a plurality of sets of capacitor electrode plates which are disposed at suitably selected locations in the fuel tank and all connected in parallel. Since most fuel tanks for vehicles are provided with baffleplates which are fixedly disposed in each tank so as to divide the interior of the tank into several sections, which are communicating with one another, for the purpose of suppressing noise-producing undulations of the fuel during running of the vehicle, it is also usual to utilize the baffleplates for mechanically supporting the capacitor electrode plates of the liquid quantity sensor.

Irrespective of the configuration and arrangement of the capacitor electrode plates, it is very important for accurate detection of the liquid quantity to keep an accurate and uniform distance between each pair of electrode plates. My copending U.S. Patent Application Ser. No. 330,782 filed Dec. 14, 1981, which is incorporated herein by reference, discloses an improved liquid quantity sensor of the capacitor type in which the accuracy and uniformity of the distance between each pair of electrode plates (one of which is a baffleplate) are assured by a plurality of insulating spacers which have an accurately determined length or thickness and are inserted between the two electrode plates.

However, there is yet another matter that adversely affects the accuracy of liquid quantity sensors of the capacitor type. In many cases current liquid quantity sensors of this type applied to vehicle fuel tanks have at least one pair of capacitor electrode plates that are angled or bent to provide a vertical bend with a view to reducing errors in the measurement attributed to irregular movements of fuel in the tank. In industrial production of such liquid quantity sensors it is difficult to keep a uniformly constant distance between the paired two electrode plates in the bent region thereof, and therefore the mass-produced liquid quantity sensors of the same design often indicate somewhat different capacitance values for a given quantity of liquid in a container such as a fuel tank.

SUMMARY OF THE INVENTION

It is an object of the present invention to provide an improved liquid quantity sensor of the capacitor type, which sensor has at least one pair of bent electrode plates but does not suffer from inaccuracy of measurement attributed to the presence of the bent region of the electrode plates.

A liquid quantity sensor according to the invention has at least one set of a first electrode plate and a second electrode plate which are substantially vertically disposed in a liquid container and spaced from each other in a parallel arrangement so as to provide a capacitor, wherein the first electrode plate is of an angled shape and has at least one bent region as a border between two flat areas. The improvement according to the invention resides in that the second electrode plate is of a split form and comprises two flat portions and a junction portion which is made of an electrically conductive material and fixed to the two flat portions so as to provide a gap between the two flat portions and to keep the two flat portions at an angle corresponding to the angle formed between the two flat areas of the first electrode plate, that the second electrode plate is fastened in the two flat portions thereof to the two flat areas of the first electrode plate such that the aforementioned gap is located right opposite and parallel to the bent region of the first electrode plate, and that the junction portion of the second electrode plate is so shaped and arranged as to become more spaced from the first electrode plate than the two flat portions of the second electrode plate.

As will be understood from the above statement, the fundamental concept of the present invention is to eliminate any bent region from one of the two electrode plates that form a capacitor to thereby substantially exclude the bent region of the other electrode plate from the capacitor.

Though the capacitor formed by using the split electrode plate according to the invention is angled as a whole, the capacitance characteristic of the capacitor is determined by the size of and the distance between the flat regions of the two electrode plates, and the bent region of the first electrode plate does not participate in the function of the capacitor. In the flat regions, it is relatively easy to realize and keep an accurately constant and uniform distance between the two electrode plates by utilizing, for example, the spacer techniques described in the prior application quoted hereinbefore. Therefore, the angled shape of the capacitor in the liquid quantity sensor according to the invention does not adversely affect the accuracy of the capacitance. In the industrial production of this sensor, certainly it will be possible to greatly reduce the dispersion of the capacitance among the products.

DETAILED DESCRIPTION OF THE INVENTION

Prior to the description of preferred embodiments of the present invention, a brief description of a liquid quantity sensor which the applicant has previously proposed will be given with reference to FIGS. 1 to 3.

Figure 1:
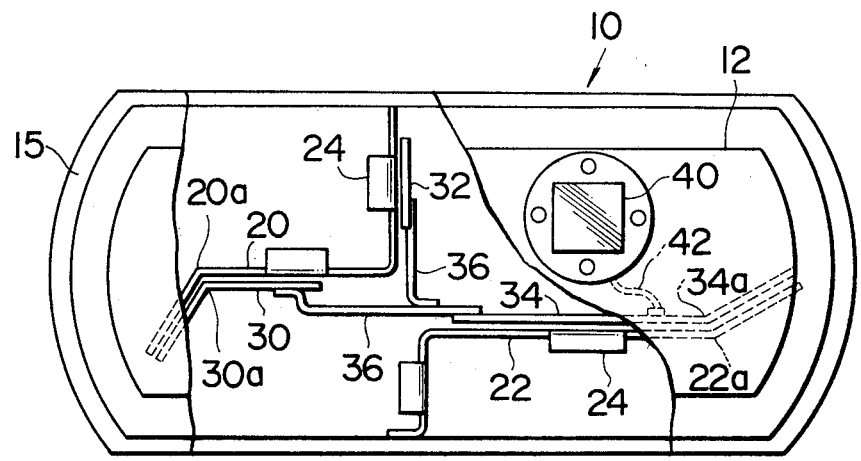
FIGS. 1 and 2 show an automobile fuel tank, which is provided with a liquid quantity sensor of the capacitor type proposed heretofore, in partly cutaway plan view and in a vertical sectional view, respectively.
Figure 2:
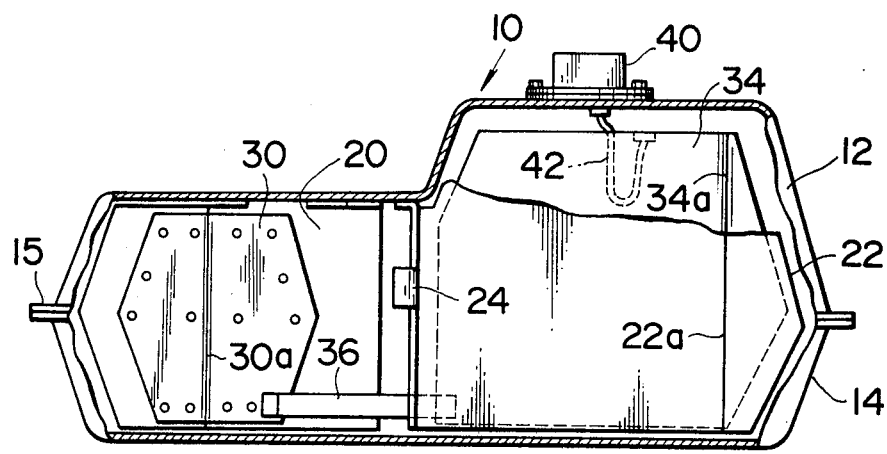

FIGS. 1 and 2 show a fuel tank 10 for an automobile. Fundamentally this fuel tank 10 is made up of an upper shell 12 and a lower shell 14, which are formed of sheet metal and welded to each other along their side peripheral flanges 15. The fuel tank 10 is provided with baffleplates 20 and 22 to suppress violent and noise-producing movement of liquid fuel contained in the tank and great undulations of the fuel level during operation of the car. Each of these baffleplates 20 and 22 is a steel plate disposed vertically and angled so as to become generally L-shaped or Z-shaped in plan view of the tank 10. Each baffleplate 20, 22 is formed with small flanges 24 at which the baffleplate is fixed to the inner surface of the upper shell 12 by spot welding for instance.

Besides the baffleplates 20, 22, three metal plates 30, 32 and 34 herein called electrode plates are vertically disposed in the fuel tank 10. The first electrode plate 30 is smaller in surface area than the first baffleplate 20 and is arranged parallel to this baffleplate 20 with a short and definite horizontal distance therebetween. Since the baffleplate 20 is angled within this region to have a vertically extending bend 20a, the electrode plate 30 is similarly angled to have a bend 30a that extends parallel to the bend 20a of the baffleplate 20. The second electrode plate 32 is arranged parallel to another selected region of the first baffleplate 20 with the aforementioned horizontal distance therebetween. Since the baffleplate 20 is flat in this region the second electrode plate 32 is also flat. The other baffleplate 22 is also angled to have a vertically extending bend 22a, and accordingly the third electrode plate 34 which is arranged parallel to this baffleplate 22 with the aforementioned horizontal distance therebetween has a bend 34a that extends parallel to the bend 22a of the baffleplate 22.

Figure 3:
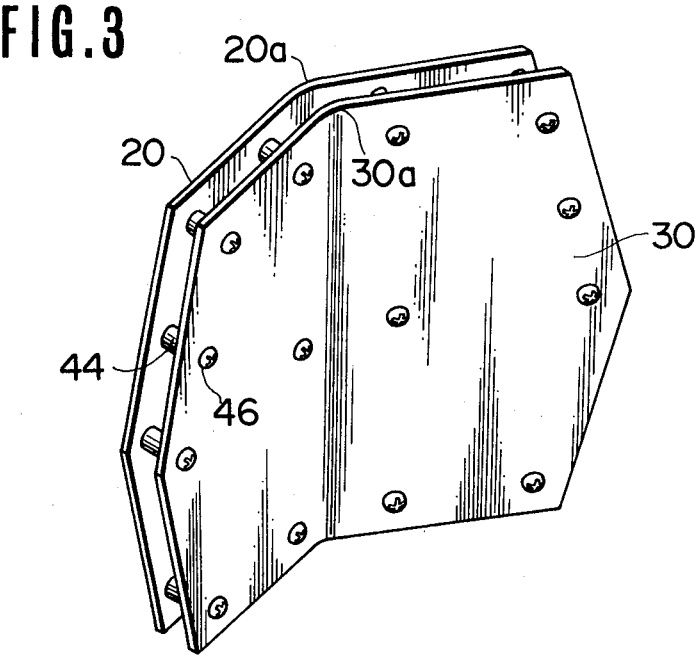
FIG. 3 is a perspective view of a set of angled electrode plates as a part of the liquid quantity sensor in FIGS. 1 and 2.

To keep the predetermined distance between the respective electrode plates 30, 32, 34 and the opposite baffleplates 20, 22, each electrode plate is mechanically fastened to the opposite baffleplate at a plurality of points as can be seen in FIG. 3, but the fastening is made such that each electrode plate is electrically insulated from the opposite baffleplate. Referring to FIG. 3, an electrically insulating tubular spacer 44 is inserted between the baffleplate 20 and the opposite electrode plate 30 at each point of fastening by means of a machine screw 46 and an insulating washer (not shown). The tubular spacer 44 has a length accurately corresponding to the intended distance between the baffleplate 20 and the opposite electrode plate 30. The use of a fairly large number of spacers 44 for each electrode plate, which is formed of a relatively thin sheet of metal, is effective for accurate spacing of the electrode plate from the opposite baffleplate.

It will be understood that each of the three electrode plates 30, 32, 34 and the opposite area of the baffleplate 20, 22 form a capacitor. In other words, each baffleplate is partly utilized also as one of a pair of electrode plates that provide a capacitor. Referring again to FIGS. 1 and 2, an assembly of elongate bus bars 36 is fixed to lower end regions of the three electrode plates 30, 32, 34 so as to electrically connect the three capacitors formed by three electrode plates 30, 32, 34 and the opposite areas of the baffleplate 20, 22 in parallel. In this state the three capacitors are connected to a capacitance measuring device 40 by lead wire 42 which is connected, in the illustrated case, to the third electrode plate 34 in an upper end region thereof. For example, the capacitance measuring device 40 has an oscillator circuit which produces a pulse signal the frequency of which is inversely proportional to the capacitance of a capacitor connected thereto. Thus, the selected area of the baffleplates 20, 22, three electrode plates 30, 32, 34 and the capacitance measuring device 40 provide a liquid sensor to detect the quantity of fuel present in the tank 10.

In the liquid quantity sensor shown in FIGS. 1-3 the arrangement of the three capacitors as well as the configuration of the respective capacitors and the bending of the selected two capacitors are suitably made on the basis of a precise calculation in order to minimize errors in the detection of the quantity of fuel present in the fuel tank 10 even when the tank 10 inclines and/or the fuel level undulates within anticipated limits. In principle, the accuracy and uniformity of the distance between the two electrode plates of each capacitor are assured by the employment of the spacers 44. In industrial practice, however, the angled configuration of the first capacitor provided by the baffleplate 20 and the electrode plate 30 and the third capacitor provided by the baffleplate 22 and the electrode plate 34 offers difficulty in realizing an accurate and uniform distance between the two electrode plates of each of these two capacitors in a region containing the bends 20a, and 30a, or 22a and 34a, of the respective plates. Referring to FIG. 3 for convenience, the baffleplate or electrode plate 20 and the other electrode plate 30 are usually different in thickness and are bent individually prior to assembling thereof. Though the bending of each of the two electrode plates 20, 30 is carried out correspondingly to the bending of the other electrode plate, it is almost inevitable that the distance between the subsequently assembled two electrode plates 20 and 30 becomes somewhat deviated from the predetermined distance in a limited region containing the bends 20a, 30a of the respective electrode plates 20, 30. In mass production, it is also inevitable that the manner and extent of the deviation of the distance in the bent region differ from individual product to individual product, and consequently the mass-produced liquid quantity sensors of the same design exhibit different capacitance values for a given quantity of fuel in the tank 10.

The present invention has been made with a view to solving this problem in liquid quantity sensors of the above described type.

Figure 4:
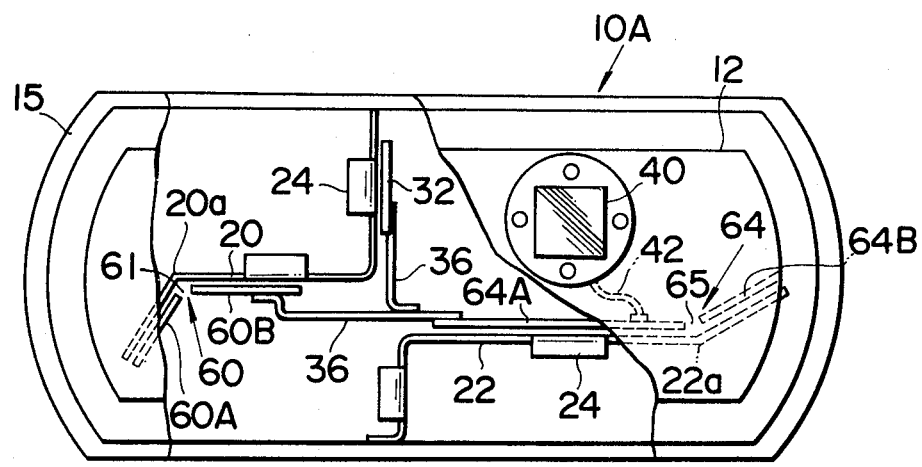
FIGS. 4 and 5 show an automobile fuel tank, which is fundamentally similar to the tank of FIGS. 1 and 2 but is provided with a liquid quantity sensor according to the invention, in partly cutaway plan view and in a vertical sectional view, respectively.
Figure 5:
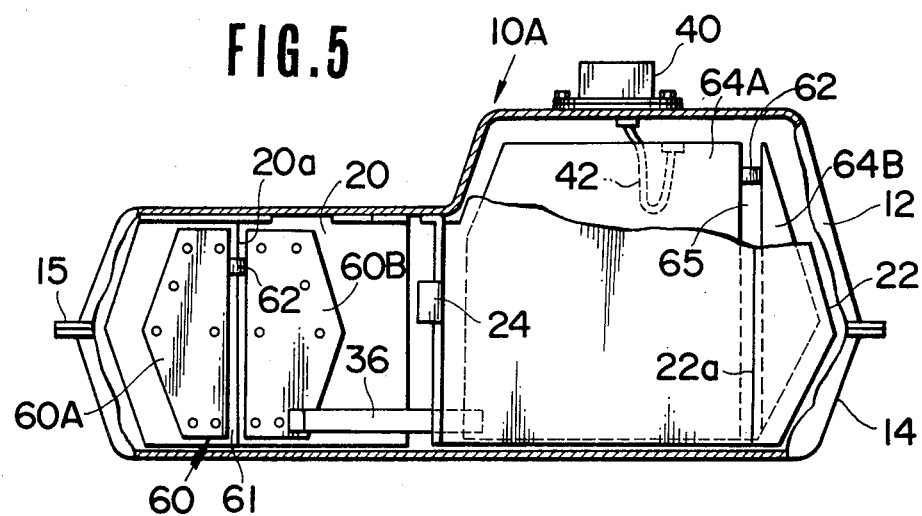

FIGS. 4 and 5 illustrate the application of the present invention to the fuel tank 10 and the contained liquid quantity sensor shown in FIGS. 1 and 2. The liquid quantity sensor in FIGS. 4 and 5 also utilizes the baffleplates 20 and 22 and is similar in general construction to the liquid quantity sensor in FIGS. 1 and 2. The novel feature of the invention resides in the form of an electrode plate 60 which is combined with the angled part of the baffleplate 20 as a counterpart of the first electrode plate 30 in FIGS. 1 and 2 and another electrode plate 64 which is combined with the angled part of the other baffleplate 22 as a counterpart of the third electrode plate 34 in FIGS. 1 and 2. Since these two electrode plates 60 and 64 are similar in principle, a detailed description will be given only about the first one 60.

The electrode plate 60 as a whole has an angled configuration corresponding to the angled baffleplate 20 but is not actually bent. That is, this electrode plate 60 is made up of two major portions 60A and 60B, which are each in the form of flat plate and are so arranged as to form an angle equal to the angle of bending of the baffleplate 20 and to provide a gap 61 therebetween, and a minor portion 62 which connects the two major portions 60A and 60B to each other both mechanically and electrically. The two major and flat portions 60A and 60B are arranged opposite and parallel to the flat areas of the baffleplate 20 bounded by the bend 20a, and the gap 61 extends in front of and parallel to the bend 20a of the baffleplate 20. Similarly, the electrode plate 64 combined with the other baffleplate 22 is made up of two major flat portions 64A and 64B and a minor junction portion 62 to have a gap 65 which extends parallel to the bend 22a of the baffleplate 22. In the liquid quantity sensor of FIGS. 4 and 5 the electrode plate 32 combined with the flat portion of the baffleplate 20 is an entirely flat plate identical with the counterpart in FIG. 1.

Figure 6:
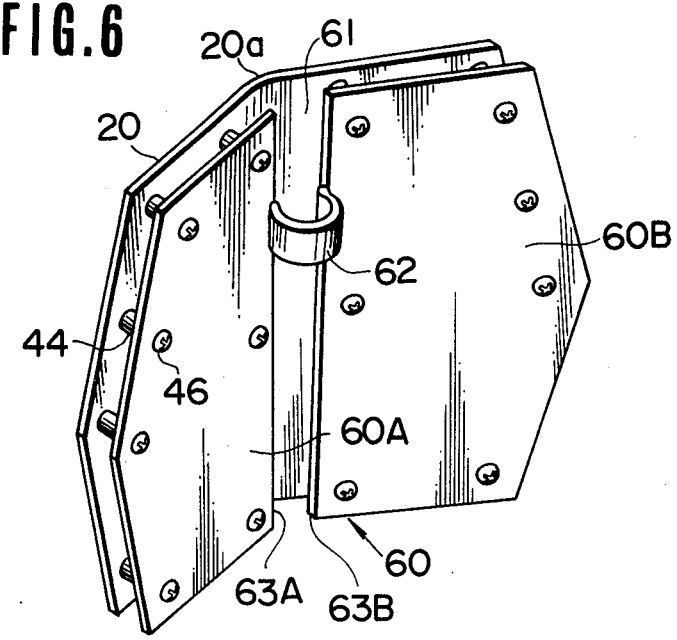
FIG. 6 is a perspective view of a set of electrode plates as a part of the liquid quantity sensor in FIGS. 4 and 5.

FIG. 6 shows the electrode plate 60 fastened to the angled part of the baffleplate 20 used as an electrode plate. The junction portion 62 is relatively small in size and, in this example, is formed integral with the two flat major portions 60A and 60B, meaning that the electrode plate 60 is a one-piece member. Similarly to the electrode plate 30 in FIG. 3, the electrode plate 60 is fastened to the opposite electrode plate 20 at a plurality of points by using the insulating tubular spacers 44, machine screws 46 and insulating washers (not shown). The split electrode plate 60 is formed such that the two flat portions 60A and 60B thereof become parallel to the flat areas of the opposite electrode plate 20 and that approximately the middle of the gap 61 between the two flat portions 60A and 60B comes right in front of the bend 20a of the opposite electrode plate 20. The gap 61 has a sufficiently large width so that orthogonal projection of the inner edges 63A and 63B of the electrode plate 60 on the opposite electrode plate 20 does not fall in the curved region formed by angling of this electrode plate 20 along the linear bend 20a. The junction portion 62 of the split electrode plate 60 is greatly curved outwards so as to become far more distant from the bend 20a of the electrode plate 20 than the vertical plane containing the gap 61. Therefore, practically no electrostatic capacitance is produced between the junction portion 62 of the split electrode plate 60 and the opposite electrode plate 20.

In the capacitor formed by the assembly of the angled electrode plate 20 and the split electrode plate 60, an effective surface area is the total of the surface areas of the two flat portions 60A and 60B of the split electrode plate 60, and the curved region along the bend 20a of the electrode plate 20 does not participate in the measurement of capacitance between the two electrode plates 20 and 60. The accuracy and uniformity of the distance between the electrode plate 20 and the flat portions 60A, 60B of the split electrode plate 60 are assured by the employment of the tubular spacers 44 having an accurately predetermined length.

Therefore, the liquid quantity sensor shown in FIGS. 4 and 5 is superior in the accuracy of measurement to the resembling liquid quantity sensor shown in FIGS. 1 and 2.

Figure 7:
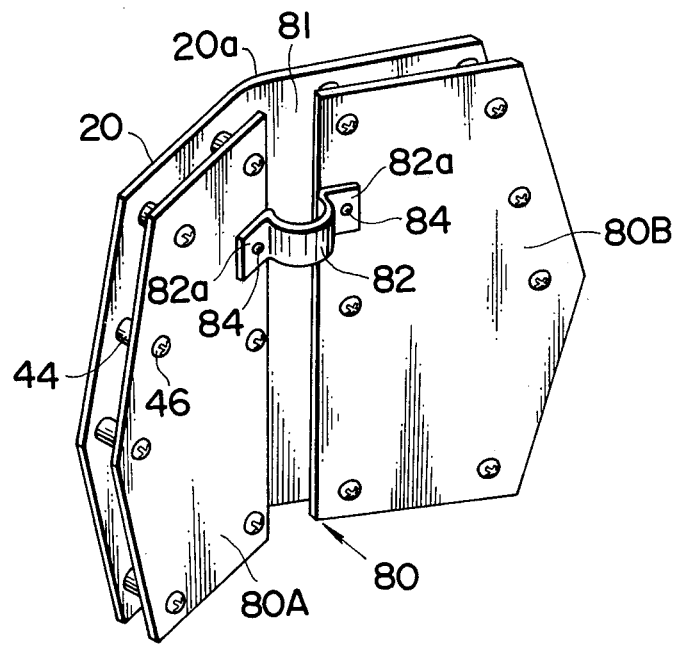
FIG. 7 is a perspective view of a set of electrode plates according to the invention as a minor modification of the one shown in FIG. 6.

FIG. 7 shows a modification of the split electrode plate 60 of FIG. 6. In the modified electrode plate 80, two flat major portions 80A and 80B and a minor junction portion 82 are each prepared as an independent member. The junction portion 82 is made of an electrically conductive material and is greatly curved outward so as to enlarge the distance between this portion 82 and the curved region of the angled electrode plate 20 in the assembled capacitor. The split electrode plate 80 is assembled by fixing the junction portion 82 in its two flange portions 82a to the two flat portions 80A and 80B by using suitable fastening means such as machine screws 84.

The capacitor formed by using the split electrode plate 80 of FIG. 7 is identical in performance with the capacitor formed by using the split electrode plate 60 of FIG. 6. The split electrode plate 80 of FIG. 7 can more easily be produced than the one-piece electrode plate 60 of FIG. 6 with reduced loss of the electrode material. Besides, fastening of this electrode plate 80 to the angled electrode plate 20 can more easily be accomplished because of the possibility of first fastening the two separate flat plates 80A and 80B to the opposite electrode plate 20 and then fixing the junction portion 82 to the two flat plates 80A and 80B.

The particular forms of the junction portions 62 and 82 illustrated in FIGS. 6 and 7 are merely exemplary, and it will readily be understood that variously different forms can also be employed. If desired, a split electrode plate according to the invention may have two or more junction portions at suitable intervals therebetween. In the case of using an angled electrode plate (which may be a baffleplate) having two or more bends, a split electrode plate according to the invention will be so formed as to have a gap for each bend of the angled electrode plate and, hence, to have three or more flat portions which are spaced from one another and connected together by a suitable number of junction portions. Furthermore, an angled electrode plate to be combined with a split electrode plate according to the invention may be replaced by a split electrode plate which is made up of at least two flat portions arranged so as to form a desired angle and to provide a suitable gap therebetween and at least one suitably curved junction portion.

What is claimed is:

1. In a sensor for detecting the quantity of a liquid existing in a container, the sensor having at least one set of a first electrode plate and a second electrode plate which are substantially vertically disposed in the container and spaced from each other in a parallel arrangement so as to provide a capacitor, wherein said first electrode plate is of an angled shape and has at least one bent region as a border between two flat areas, the improvement comprising said second electrode plate being of a split form and comprising two flat portions and a junction portion which is made of an electrically conductive material and fixed to said two flat portions so as to provide a gap between said two flat portions and to keep said two flat portions at an angle corresponding to the angle between said two flat areas of said first electrode plate, said second electrode plate being fastened in said two flat portions thereof to said two flat areas of said first electrode plate such that said gap is located right opposite and parallel to said bent region of said first electrode plate, said junction portion being so shaped and arranged as to become more spaced from said first electrode plate than said two flat portions.

2. A liquid quantity sensor according to claim 1, wherein said junction portion of said second electrode plate is formed integral with said two flat portions.

3. A liquid quantity sensor according to claim 1, wherein said junction portion of said second electrode plate is formed as an independent member and fixedly joined to said two flat portions.

4. A liquid quantity sensor according claim 1, wherein said junction portion of said second electrode plate bridges said gap and has a curved shape such that the distance between said junction portion and said first electrode plate becomes minimum in the vicinity of the boundaries of said gap.

5. A liquid quantity sensor according to claim 1, wherein each set of said first and second electrode plates further comprises a plurality of spacers of an electrically insulating material which are inserted between said flat areas of said first electrode plate and said flat portions of said second electrode plate and arranged at a distance from one another, said spacers all having the same thickness which agrees with a predetermined horizontal distance between said first and second electrode plates.

6. A liquid quantity sensor according to claim 1, wherein first electrode plate is shaped so as to serve also as a baffleplate.

* * * * *